United States Patent
Borsvold

[15] 3,690,796
[45] Sept. 12, 1972

[54] APPARATUS FOR VULCANIZING ELASTOMERIC HOSE

[72] Inventor: Herbert H. Borsvold, Akron, Ohio

[73] Assignee: The B. F. Goodrich Company, New York, N.Y.

[22] Filed: Aug. 21, 1970

[21] Appl. No.: 65,776

[52] U.S. Cl. ................... 425/90, 263/3, 263/32, 264/166, 264/347, 425/113, 425/289, 425/383
[51] Int. Cl. ............ F27b 7/20, F27b 9/28, B29h 7/14
[58] Field of Search ....... 18/12 TM, 12 TB, 12 TS, 12 TT, 18/4 B, 4 P, 4 S, 135.13 R, 13 J; 164/86, 270, 275, 276; 29/527, 2, 424; 264/166, 347; 263/3, 32; 425/90, 383, 289, 113

[56] References Cited
UNITED STATES PATENTS

| | | |
|---|---|---|
| 3,255,284 | 6/1966 | Meislohn ............... 264/166 X |
| 3,479,419 | 11/1969 | Hochhauser ........... 264/347 X |
| 3,154,442 | 10/1964 | Nye et al ................... 263/3 X |
| 3,015,427 | 1/1962 | Kessler ............. 18/12 TT UX |

*Primary Examiner*—Robert L. Spicer, Jr.
*Attorney*—W. A. Shira, Jr. and Joseph J. Januszkiewicz

[57] ABSTRACT

An elastomeric hose is encased in a lead sheath and continuously wound in a coil over a drum rotating about a vertical axis, heated to vulcanizing temperature while thereon and leaves the drum in the cured state. The cured hose leaves the drum continuously at a level lower than that at which it enters whereby the lead covered coil drops one pitch with each revolution of the drum such that the position of the hose coil on the drum remains substantially fixed.

4 Claims, 2 Drawing Figures

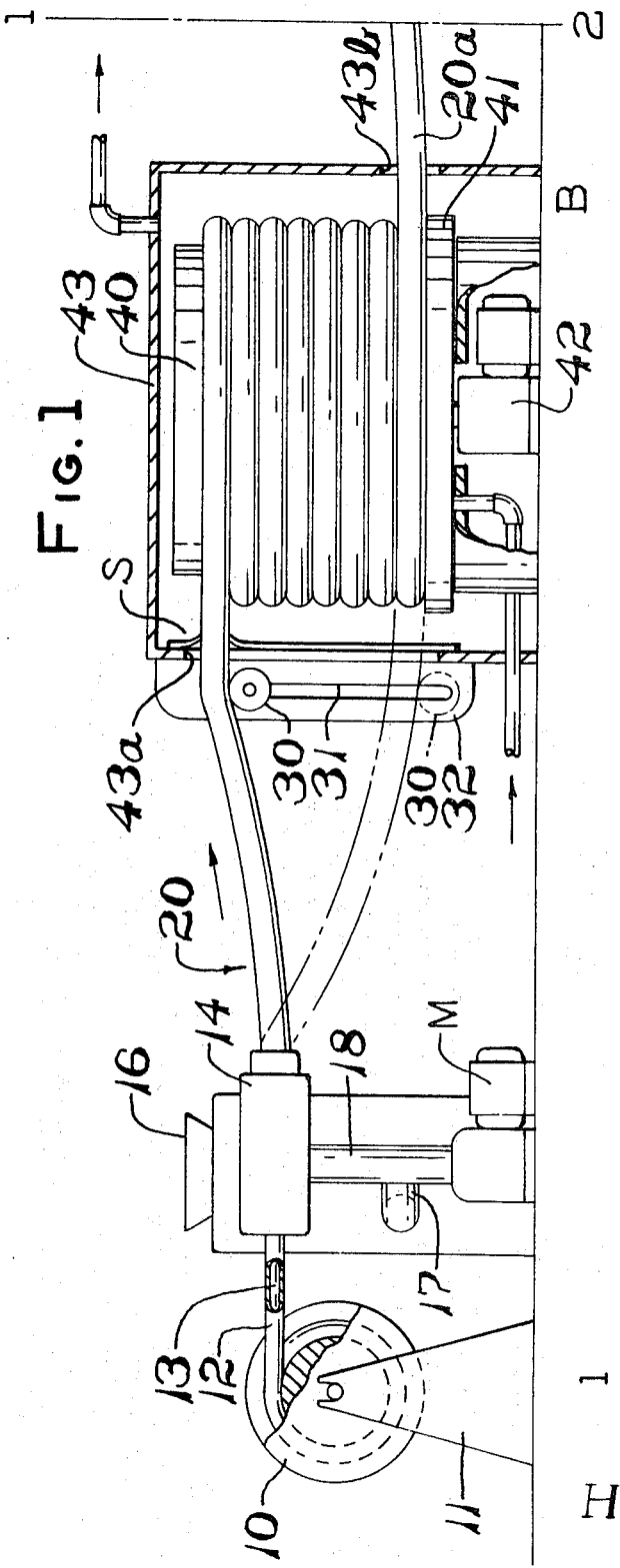
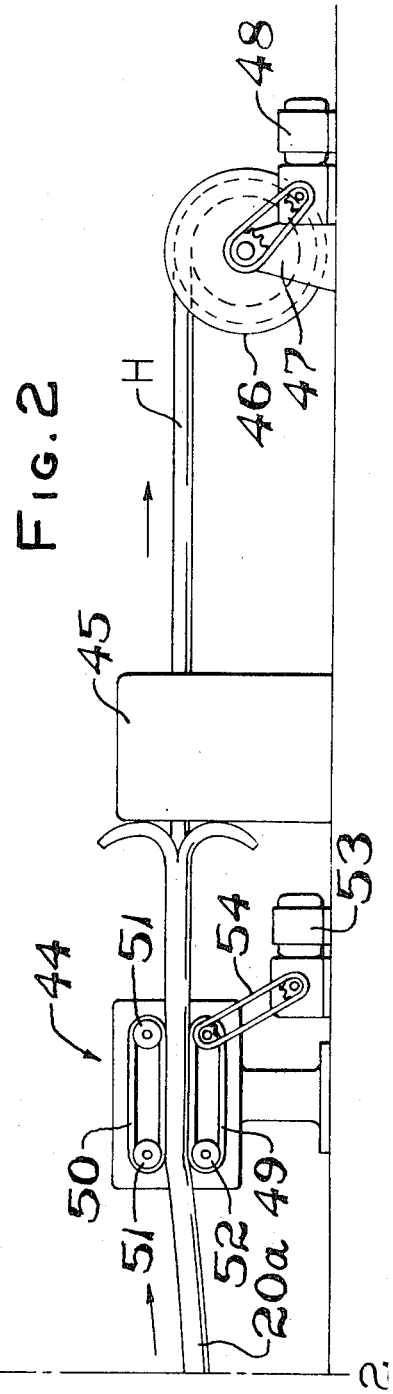

APPARATUS FOR VULCANIZING ELASTOMERIC HOSE

BACKGROUND OF THE INVENTION

In the manufacture of elastomeric hose, one method for curing mandrel built hose of diameters generally less than two inches is that of extruding a lead sheath over the hose and placing it into an oven for vulcanizing. In this method, the hose is sandwiched radially in compression between the lead sheath and the mandrel during the vulcanizing operation.

Heretofore, this method of curing elastomeric hose has been applied commercially in either of two forms. In one form, designated lengths of the lead covered hose have been cut and placed in a linear configuration in an oven of sufficient length and size to accept a desired number of hose lengths in one charge. In this form or manner of curing, the number of hose lengths that can be cured in one charge or cycle is obviously limited by the size of the oven. Thus, where it is desired to cure a large quantity of hose sections at one time, a large and costly oven is required or, in the alternative, a plurality of ovens of lesser size in which case the initial cost of the ovens is often prohibitive.

The other manner commonly used for curing hose which has been covered with a lead sheath incorporates winding a desired length of lead covered hose to be cured on a drum or spool and then transporting the spool of lead covered hose into an oven for curing.

In general, the technique of curing elastomeric hose wherein the hose is encased in lead prior to and during the curing cycle, has involved cumbersome handling steps which require expensive equipment for handling and which further prevent rapid curing of the hose and thus result in a limited production rate. Moreover, a large quantity of lead is required for this batch type curing. It has thus been desirable to find an efficient method for continuous rapid curing of elastomeric hose while encased in a lead sheath without requiring the hose to be handled in separate lengths while covered with lead and retain the lead sheath technique since it provides a convenient and easy-to-remove expedient for compressing the elastomer during curing.

SUMMARY OF THE INVENTION

The present invention provides a solution to the above-described problem associated with curing elastomeric hose while encased in lead. The invention incorporates continuously winding the lead covered hose about a drum positioned to rotate about a vertical axis with the lead covered hose forming a coil over the drum and feeding continuously on and off the drum. The lead covered hose is heated to and maintained at vulcanizing temperature while it is rotating on the drum, such that any given portion of the hose is cured between the time it enters the drum and leaves the drum. The lead casing is continuously stripped from the cured hose as it leaves the drum. The position of the coil on the drum remains substantially constant thereby permitting continuous uninterrupted curing of the hose. Moreover, since the lead is stripped from the house continuously as it exits from the drum, it is therefore no longer necessary to handle or transport heavy lengths of lead covered hose from one station to another during or after the vulcanizing operation and the lead is immediately available for reuse.

BRIEF DESCRIPTION OF THE DRAWINGS

FIG. 1 is a side elevation view in a somewhat schematic form of the initial portion of the curing line and shows the hose exiting from the lead extruder and feeding continuously onto and exiting from the rotating drum.

FIG. 2 shows the terminal stage of the curing line, showing the hose as it exits from the drum and is fed through a lead stripper and onto a reel;

FIGS. 1 and 2 when joined on the line 1—2 of each become a single view of the entire curing line.

DETAILED DESCRIPTION

Referring first to FIG. 1, the reel or spool 10 is rotatably mounted between a pair of stanchions 11, the spool 10 having wound thereon a desired length of elastomeric hose 12 containing a mandrel 13 continuously through the bore thereof. In the presently preferred practice of the invention, the uncured elastomeric hose 12 has a nylon mandrel inserted in the bore; however, other materials may be used for the mandrel, as, for example, vulcanized rubber. The hose with the mandrel therein is fed continuously off the reel 10 and into a lead extruder 14 which is supplied continuously with molten lead from a pot 16 through a heated feed tube 17 and is powered by a motor and gear drive M. The lead is fed continuously from a head lead pot 16. In the presently preferred practice of the invention, a vertical casing 18 serves as a stanchion for the lead extruder 14 with the heated feed pipe 17 positioned at a level below the extruder.

Uncured lead covered hose is thus formed, denoted by the general term 20 in FIG. 1 and exits continuously from the extruder and then passes over a lay-up feeder pulley 30. A supporting frame 32 is provided with a vertically disposed slot 31 formed therein with the pulley 30 mounted so as to transverse vertically in the slot 31. If desired, the feeder pulley 30 may be supported vertically by a separate spring means (not illustrated) along the slot 31 to balance and support the weight of the lead covered hose traveling thereover. From the pulley 30, the lead covered hose 20 travels continuously onto a drum 40 disposed so as to rotate about a vertical axis, the drum being mounted on a turntable 41 powered by a motor and gear drive 42. The lead covered hose 20 is initially coiled about the drum beginning at the bottom and adding a desired number of revolutions and thereafter feeding onto the drum at a level above that at which it exits. The drum is enclosed in an oven 43 which has a vertical slot 43a formed in the wall thereof with the hose passing through the slot as it enters the oven, the hose being free to travel vertically in the slot as it feeds over the lay-up feeder pulley 30. As the drum is rotated, the hose feeds continuously off the lower portion of the drum at the surface of the turntable 41 and exits through an aperture 43b provided in the wall of the oven and located at station "B" in FIG. 1. A flap seal "S" having a central slit therein is provided along aperture 43b for preventing heat loss from the oven chamber 43. Furthermore, the motor and gear drive 42, although illustrated as located within the oven 43, may for convenience be external of the oven.

In the presently preferred practice of the invention, combustion product gases from a gas fired heater (not illustrated) are circulated continuously through the oven by separate blower means (not illustrated) to provide the necessary heat for raising the lead covered hose to the proper vulcanizing temperature. However, it will be understood that other techniques for heating may be employed as, for example, irradiating the lead covered hose as it rotates on the drum with heat lamps or other radiant heating devices or, alternatively, introducing steam under pressure into a central chamber formed in the drum and thereby raising the drum to vulcanizing temperature. Furthermore, any desired combination of these heating techniques may be used.

In the present practice of the invention, the motor gear drive 42 which rotates drum 40 is synchronized with the speed of the extruder such that substantially no tension is maintained in the lead encased hose 20 as it travels between the extruder 14 and the lay-up feeder pulley 30. It will be understood that by appropriate selection of drum diameter and drum rotation speed, which is usually limited by the extruder output, complete curing of the hose on the drum at the rate at which it exits from the extruder may be obtained by proper choice of the number of coils of hose wound on the drum. For example, in the present practice of the invention, the drum 40 has a diameter of 16 feet, with a corresponding circumference of approximately 50 feet, and the lead covered hose 20 is wound 60 revolutions about the drum so that 1 revolution per minute of the drum yields an output of 50 feet of vulcanized hose per minute. This will be understood by observing that a given portion of hose 50 feet in length entering the drum as the initial coil, makes one revolution of the drum in 1 minute, and requires 60 revolutions of the drum to exit from the drum at the terminal coil, thus remaining on the drum for 60 minutes. Thus, a portion of hose 50 feet in length as a dwell period of 60 minutes on the drum, during which time it is maintained at vulcanizing temperature and is cured. Although the drum has a diameter of 16 feet and rotates at a speed of 1 revolution per minute in the presently preferred practice, it will be understood that the diameter of the drum and the speed of rotation and the number of coils wrapped around the drum may be chosen for convenience in accordance with the desired production rate consistent with the mass-extrusion capability of lead extruder 14. The extruder 14, in the present practice of the invention, operates at a capacity of 120 pounds of lead per minute. The rate of extrusion may be varied to provide sufficiently rapid lead encasement of the hose depending upon the diameter of the hose to be cured, in order to prevent any substantial tension between the extruder and the drum rotating at 1 revolution per minute.

Referring again to FIG. 1, the lead covered hose 20 is shown in solid outline as it enters the drum during continuous curing. However, for initial start-up of the curing operation, with no windings on the drum, the output of the extruder is fed initially onto the lower portions of the drum at the deck of the turntable with the initial position of the hose 20 and lay-up follower 30 shown in phantom outline in FIG. 1. The drum is then rotated until the desired number of coils are wound about the drum whereupon the lay-up feeder pulley 30 is in the upper position shown in solid outline and the hose is entering the drum at the top as illustrated in FIG. 1 in solid outline. When the desired number of coils have been wound initially around the drum, the end of the hose is pried loose from the bottom of the coils at the deck of the turntable 41, and the drum rotated such that the end of the lead covered hose is fed through aperture 43b to exit from the oven. Thereafter, as the drum rotates, the hose feeds continuously from the extruder, over the lay-up feeder pulley 30 and onto the upper portion of the drum and exits continuously from the bottom of the drum at the turntable 41.

Referring now to FIG. 2, at station 1—2, the hose, after exiting from the drum passes through a tension puller 44. From the tension puller 44 the cured lead covered hose 20a is fed continuously through a lead stripper 45 whereupon the lead casing is removed. The stripped cured hose H then feeds continuously onto a take-up reel 46 mounted between a pair of stanchions 47 and driven by a motor gear drive 48. The tension puller 44 preferably comprises a pair of traction belts 49—50 running longitudinally of the hose and contacting the hose on opposite sides thereof. The traction belts 49 and 50 each orbit over a pair of rollers 51 and 52 respectively which rollers are disposed transversely of the lead covered hose with one roller of each pair being driven to rotate in opposite directions by a motor gear drive 53 connected to the rollers by chain 54. Thus, as the cured lead covered hose emerges from the oven, the lead casing is stripped continuously therefrom and the cured hose H is wound onto a spool for shipping. If desirable, forced cooling may be provided on the lead covered hose as it emerges from the oven, for example, by a water spray (not illustrated) or other cooling devices. Furthermore, as the lead casing is stripped from the cured hose by the stripper 44, the lead may be recycled by collecting the chips in a hopper (not shown) and feeding the chips into a conveyor belt (not shown) for returning them to the lead pot 16 for remelting, thereby minimizing the amount of lead required to maintain continuous operation.

The tension puller 44 maintains sufficient tension on the cured lead covered hose to pull it off of the rotating drum 40 from the terminal coil resting on the deck of turntable 41. It will be noted that a tension puller is required in view of the weight of the coils of lead covered hose resting on the terminal coil. Thus, in operation, the lead covered hose feeds onto the drum near the top of the drum and is pulled from the drum at the bottom thereof by tension puller 44 while the terminal coil of the hose rests against the deck of turntable 41. As each coil exits continuously from the drum, the remaining coils slide vertically downward continuously such that the terminal coil is constantly in contact with the deck of turntable 41.

When a desired amount of cured hose has been wound on the reel 46, it is cut. A portion of the reel (not illustrated) is then collapsed internally and a source of water under pressure connected to the cut end of the cured hose. As the water under pressure is applied internally to the hose, the mandrel 13 is discharged from the cured hose while same is still on reel 46. After removal of the mandrel, the finished hose is removed from the reel for inspection and shipment.

The method of the present invention thus enables elastomeric hose to be vulcanized continuously while encased in a lead sheath and the lead sheath stripped continuously from the cured hose. The present method thus eliminates the necessity of transporting lengths of lead covered hose to different stations during and after vulcanization.

Modifications and adaptations of the invention will be apparent to those having ordinary skill in the art and the invention is limited only by the spirit and scope of the following claims.

I claim:

1. An apparatus for vulcanizing elastomeric hose comprising:
    a. means for axially moving a length of said hose;
    b. means providing said hose with a lead covering as it is axially moved;
    c. means to cause said covered hose to move in a helical path about a vertical axis such that the hose enters said helical path at a vertical position above the position at which it leaves said helical path;
    d. means to heat said hose to a curing temperature while moving in said helical path;
    e. means to remove said lead covering from the hose after passage from said helical path.
    f. said means to move said hose includes an enclosure having apertures through which said hose is passed to and from and means within said enclosure to maintain said hose in an annular path while there.

2. An apparatus as defined in claim 1, wherein said means for moving the hose in a helical path comprises an enclosure, a rotatable drum within the said enclosure, and the said enclosure has apertures adjacent the opposite ends of said drum through which apertures the hose is passed to and from a helical coiled condition about said drum.

3. An apparatus as defined in claim 2, wherein said drum is disposed with its axis vertically and said inlet aperture for introduction of the hose into said enclosure is adjacent the upper portion of the latter and the said aperture for exit of the hose from the enclosure is adjacent the lower end thereof.

4. An apparatus as defined in claim 2, wherein means are provided for circulating heated fluid to and from said enclosure.

* * * * *